(12) United States Patent
Kim et al.

(10) Patent No.: US 8,849,020 B2
(45) Date of Patent: Sep. 30, 2014

(54) SEARCH SYSTEM USING IMAGES

(75) Inventors: Jeong-Tae Kim, Seoul (KR);
Sang-Whan Moon, Seoul (KR);
Jin-Myeong Ahn, Seoul (KR)

(73) Assignee: Jeong-Tae Kim, Seoul (KR)

( * ) Notice: Subject to any disclaimer, the term of this patent is extended or adjusted under 35 U.S.C. 154(b) by 0 days.

(21) Appl. No.: 13/330,210

(22) Filed: Dec. 19, 2011

(65) Prior Publication Data
US 2012/0093403 A1 Apr. 19, 2012

Related U.S. Application Data

(63) Continuation of application No. 12/488,884, filed on Jun. 22, 2009, now Pat. No. 8,103,692.

(30) Foreign Application Priority Data

Jul. 22, 2008 (KR) .................. 10-2008-0071018
Jan. 7, 2009 (KR) .................. 10-2009-0001073

(51) Int. Cl.
*G06F 17/30* (2006.01)

(52) U.S. Cl.
CPC .................. *G06F 17/3025* (2013.01)
USPC .................. 382/165; 382/192; 707/772

(58) Field of Classification Search
CPC .................. G06F 17/30244; G06F 17/30247; G06F 17/3025; G06F 17/30256; G06F 17/30259; G06F 17/30271; G06F 17/30277; G04N 1/644; G06K 9/4633; G06K 9/46; G06T 7/408
See application file for complete search history.

(56) References Cited

U.S. PATENT DOCUMENTS

| | | | | |
|---|---|---|---|---|
| 4,992,887 A | * | 2/1991 | Aragaki | ............ 358/403 |
| 5,579,471 A | * | 11/1996 | Barber et al. | ............ 715/700 |
| 5,872,865 A | | 2/1999 | Normile et al. | |
| 6,002,794 A | | 12/1999 | Bonneau et al. | |
| 6,222,939 B1 | | 4/2001 | Wiskott et al. | |

(Continued)

FOREIGN PATENT DOCUMENTS

| | | |
|---|---|---|
| KR | 10-2007-0034343 | 3/2007 |
| KR | 10-2008-0101255 | 11/2008 |

OTHER PUBLICATIONS

"Comparing Images Using Color Coherence Vectors," by Pass et al. In: Multimedia '96 Proc. 4th ACM Int'l Conf. on Multimedia (1996). AVailable at: ACM.*

(Continued)

*Primary Examiner* — Daniel Kinsaul
(74) *Attorney, Agent, or Firm* — Finnegan, Henderson, Farabow, Garrett & Dunner, LLP

(57) ABSTRACT

A search system using images is provided in which when a user does not know a relevant URL or search keyword correctly while surfing the Internet, he or she can search a desired website using only an image. The search system using images according to the present invention comprises an image search server and a user terminal. The image search system comprises: an image conversion section for converting the image included in the website information and the to-be-searched image uploaded by the user into search format images; an image search section for comparing eigen values of both the to-be-searched image uploaded by the user and the search image included in the website information and detecting the website information having a matching eigen value; and a storage section for storing the detected website information, the image included in the website information, and information regarding eigen values.

24 Claims, 8 Drawing Sheets

| 1 (R) | 2 (G) | 2 (G) | 2 (G) | 2 (G) | 3 (B) |
|---|---|---|---|---|---|
| 3 (B) | 3 (B) | 2 (G) | 2 (G) | 3 (B) | 2 (G) |
| 2 (G) | 1 (R) | 1 (R) | 1 (R) | 2 (G) | 2 (G) |
| 2 (G) | 3 (B) | 3 (B) | 3 (B) | 3 (B) | 1 (R) |

R: Red   G: Green   B: Blue

(56) References Cited

U.S. PATENT DOCUMENTS

| | | | |
|---|---|---|---|
| 6,466,695 | B1 | 10/2002 | Pötzsch et al. |
| 6,563,950 | B1 | 5/2003 | Wiskott et al. |
| 6,584,223 | B1* | 6/2003 | Shiiyama ............... 382/173 |
| 6,633,407 | B1* | 10/2003 | Kim et al. ............... 358/1.9 |
| 6,674,907 | B1* | 1/2004 | Shum et al. ............. 382/225 |
| 6,917,703 | B1 | 7/2005 | Steffens et al. |
| 7,130,454 | B1* | 10/2006 | Berube et al. ........... 382/118 |
| 7,539,657 | B1 | 5/2009 | Liu et al. |
| 7,565,139 | B2 | 7/2009 | Neven, Sr. et al. |
| 7,639,898 | B1 | 12/2009 | Chan |
| 7,751,805 | B2 | 7/2010 | Neven et al. |
| 2001/0053249 | A1* | 12/2001 | Krishnamachari ........ 382/165 |
| 2002/0002550 | A1* | 1/2002 | Berman ...................... 707/3 |
| 2002/0135618 | A1 | 9/2002 | Maes et al. |
| 2002/0136448 | A1 | 9/2002 | Bortolussi et al. |
| 2003/0012428 | A1 | 1/2003 | Syeda-Mahmood |
| 2003/0113002 | A1 | 6/2003 | Philomin et al. |
| 2003/0161541 | A1* | 8/2003 | Ridge ....................... 382/245 |
| 2004/0081355 | A1* | 4/2004 | Takahashi ................ 382/165 |
| 2004/0135788 | A1* | 7/2004 | Davidson et al. ........ 345/530 |
| 2004/0228526 | A9* | 11/2004 | Lin et al. ................. 382/165 |
| 2005/0111738 | A1* | 5/2005 | Iizuka ....................... 382/190 |
| 2005/0129311 | A1 | 6/2005 | Haynes et al. |
| 2005/0162523 | A1 | 7/2005 | Darrell et al. |
| 2005/0171741 | A1 | 8/2005 | Doi |
| 2005/0187975 | A1 | 8/2005 | Yamane |
| 2006/0120627 | A1* | 6/2006 | Shiiyama ................. 382/305 |
| 2006/0253491 | A1* | 11/2006 | Gokturk et al. ......... 707/104.1 |
| 2007/0180265 | A1 | 8/2007 | Hiroshi |
| 2007/0288453 | A1* | 12/2007 | Podilchuk .................... 707/5 |
| 2008/0037902 | A1 | 2/2008 | Matsumoto |
| 2009/0245590 | A1 | 10/2009 | Holl et al. |
| 2009/0297050 | A1* | 12/2009 | Li et al. .................... 382/225 |
| 2009/0313294 | A1* | 12/2009 | Mei et al. ................ 707/103 R |

OTHER PUBLICATIONS

"An Efficient Color Representation for Image Retrieval," by Deng et al. In: IEEE Transactions Image Processing, vol. 10, No. 1 (2001). Available at: IEEE.*

Flickner, M. et al.; "Query By Image And Video Content: The QBIC System," IEEE, 23-32 (1995) (10 pages).

"Efficient and Effective Querying by Image Content," by Faloutsos et al., In: Journal of Intelligent Information Systems, 3, 231-262 (1994).

"Region-based image querying," by Carson et al., In: Content-Based Access of Image and Video Libraries (1997).

"A Novel Regions-of-Interest Based Image Retrieval Using Multiple Features," by Xiangyang et al. In: Multi-Media Modelling Conference Proc. (2006).

"Image Retrieval Based on Color and Texture," by Wu and Tai. In: Fuzzy Systems and Knowledge Discovery (2007).

* cited by examiner

R: Red    G: Green    B: Blue

FIG. 5

| 1<br>(R) | 2<br>(G) | 2<br>(G) | 2<br>(G) | 2<br>(G) | 3<br>(B) |
|---|---|---|---|---|---|
| 3<br>(B) | 3<br>(B) | 2<br>(G) | 2<br>(G) | 3<br>(B) | 2<br>(G) |
| 2<br>(G) | 1<br>(R) | 1<br>(R) | 1<br>(R) | 2<br>(G) | 2<br>(G) |
| 2<br>(G) | 3<br>(B) | 3<br>(B) | 3<br>(B) | 3<br>(B) | 1<br>(R) |

R: Red    G: Green    B: Blue

FIG. 6

| 1<br>(R) | 2<br>(G) | 2<br>(G) | 2<br>(G) | 2<br>(G) | 3<br>(B) |
|---|---|---|---|---|---|
| 3<br>(B) | 3<br>(B) | 2<br>(G) | 2<br>(G) | 3<br>(B) | 2<br>(G) |
| 2<br>(G) | 1<br>(R) | 1<br>(R) | 1<br>(R) | 2<br>(G) | 2<br>(G) |
| 2<br>(G) | 3<br>(B) | 3<br>(B) | 3<br>(B) | 3<br>(B) | 1<br>(R) |

R: Red    G: Green    B: Blue

FIG. 8
FIG. 9
  

FIG. 12
 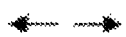 

SEARCH SYSTEM USING IMAGES

CROSS REFERENCES

This application is a continuation application of U.S. application Ser. No. 12/488,884, filed Jun. 22, 2009, now U.S. Pat. No. 8,103,692 which claims foreign priority under Paris Convention and 35 U.S.C. §119 to Korean Patent Application No. 10-2008-0071018, filed Jul. 22, 2008, and Korean Patent Application No. 10-2009-0001073, filed Jan. 7, 2009, with the Korean Intellectual Property Office, where the entire contents of all three applications are incorporated herein by reference.

BACKGROUND OF THE INVENTION

1. Field of the Invention

The present invention relates to a search system using images in which when a user does not know a relevant URL or search keyword correctly while surfing the Internet, he or she can search a desired website using only an image.

2. Background Art

In general, when Internet users want to search for desired information on the Internet, they drive a web browser for Internet access and then enter an URL address for a specific domain in an URL entry window to directly gain access to a website to be searched, or gains access to a specific portal search site and then enter a specific keyword, a sentence or the like indicating desired information in a search box provided by the search site so as to search for the desired information.

In this case, a method of using the URL address is one in which after a user has memorized or recorded alphabet characters indicative of URL information, he or she directly types them in an URL entry window so as to connect to a desired website. Also, a method of using the keyword is one mainly used when a user does not know a correct domain and is advantageous in that the user can freely search for desired information in an enormous amount of data.

However, among the aforementioned conventional methods for searching for information on the Internet, the method of using the URL address entails a problem in that when the user forgets the URL indicating a specific domain or loses the recorded information, he or she must spend considerable time finding the domain.

In addition, the method of searching for information using a keyword on the Internet encounters a problem in that when the user does not know a correct keyword indicative of information to be searched, he or she does not easily find the associated information.

That is, the conventional information search method has a problem in that when a user does not know an associated URL information or a keyword for searching a specific website, much time is spent to search for information on the Internet and is not provided with an alternative search method.

SUMMARY OF THE INVENTION

Accordingly, the present invention has been made in an effort to solve the aforementioned problems occurring in the prior art, and it is an object of the present invention to provide a search system using images in which when a user does not know a relevant URL or search keyword while surfing the Internet, he or she can search a desired website using only an image.

Another object of the present invention is to provide a search system using images, which can identify information of matching or similar images considering an error through the adjustment of the degree of similarity between images of various different angles, colors and size with respect to search images.

To accomplish the above objects, according to the present invention, there is provided a search system using images comprising an image search server for searching for an image included in website information, and a user terminal for allowing a user to register and upload a to-be-searched image in the image search server, wherein the image search system includes: an image conversion section for converting the image included in the website information and the to-be-searched image uploaded by the user into search format images, the image conversion section including a unit color management module for extracting the number of and the ratio between unit colors included in both the image included in the website information and the to-be-searched image uploaded by the user, as eigen values; an image search section for comparing an eigen value of the to-be-searched image uploaded by the user, which has been extracted in the image conversion section 120 with an eigen value of the search image included in the website information, which has been extracted in the image conversion section, and detecting the website information having a matching eigen value; and a storage section for storing the detected website information, the image included in the website information, and information regarding eigen values for the converted search format images.

Preferably, the image conversion section further includes a non-compression format conversion module for converting the image included in the website information and the to-be-searched image uploaded by the user into non-compression format images.

Preferably, the image conversion section further includes a collective region management module for extracting the number of colors and a degree of collection for the ratio between the colors at a certain region formed by collecting pixels in a similar relation among unit colors included in both the image included in the website information and the to-be-searched image uploaded by the user, as eigen values.

Preferably, the image conversion section further includes a representative color management module for reducing the image included in the website information and the to-be-searched image uploaded by the user at an arbitrary fixed ratio, reconstructing each of the reduced images in a representative color among the colors of respective pixels based on an arbitrarily simplified color palette, and extracting the reconstructed representative color as the eigen value.

Preferably, the image conversion section further includes a linear/multi-linear pattern management module for extracting the linear/multi-linear pattern information between single/plural patterns in the pattern unit as the eigen value based on the value designated to the color of each pixel in the image included in the website information and the to-be-searched image uploaded by the user in the case where the values of a linear or multi-linear pattern (a face defined by a plurality of lines adjacent to each other or a plurality of lines not adjacent to each other) of pixels, or the colors in a similar and specific relation are adjacent to each other in a pixel unit.

Preferably, the image conversion section further includes a hash value management module for extracting a hash value for an initial file of the image included in the website information and the to-be-searched image uploaded by the user as an eigen value.

Preferably, the image search section further includes an entire/partial matching selection module for adjusting an error range for a comparison result of the compared eigen values.

Preferably, the image search server further includes: a web service section for providing an Internet access service and then transmitting website information including a search image, in which the to-be-searched image of a user is registered, to the user terminal to allow the user terminal to output the transmitted website information; and a search engine for searching for the website information.

Preferably, the image search server comprises a search image registering interface screen for allowing the user terminal connected thereto through the Internet to register the search image.

BRIEF DESCRIPTION OF THE DRAWINGS

The above and other objects, features and advantages of the present invention will be apparent from the following detailed description of the preferred embodiments of the invention in conjunction with the accompanying drawings, in which:

FIG. 5 is a view illustrating conversion of the unit colors for a non-compression format image, a reduced file image and a color simplified image into an eigen value;

FIG. 6 is a view illustrating a linear pattern compared by a linear pattern comparison module;

FIG. 8 is a photographic view illustrating an image included in a search web page information;

FIG. 9 is a photographic view illustrating two images for use in the entire matching determination for the eigen values;

FIG. 12 is a photographic view illustrating two images for use in the partial matching determination for the linear/multi-linear pattern information when the search image is a part of the to-be-searched image and the search image and the to-be-searched image are different from each other in terms of color.

DETAILED DESCRIPTION

Figure 1:
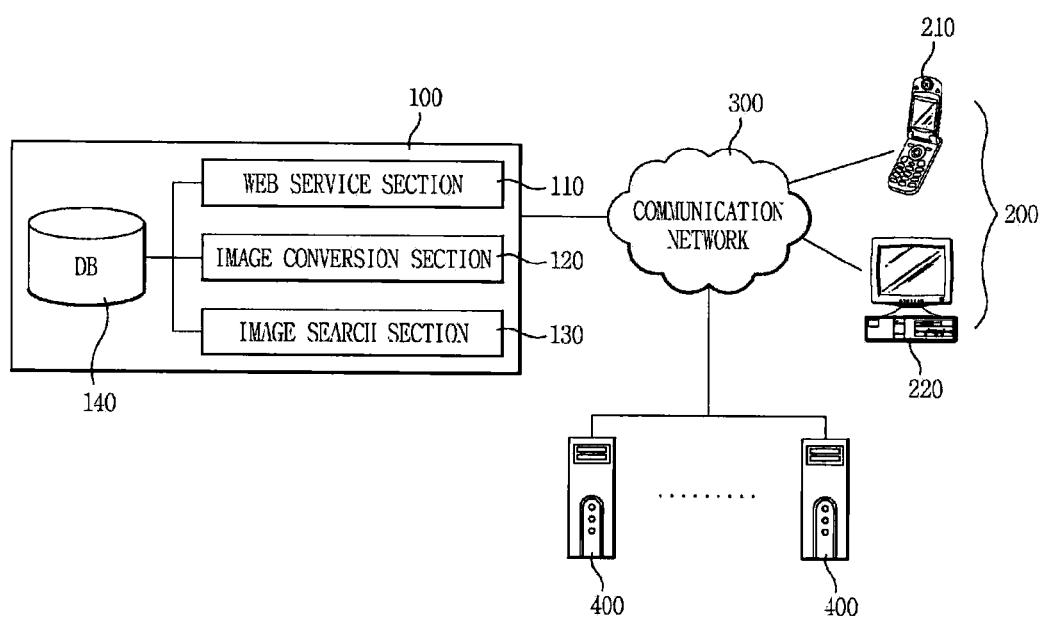
FIG. 1 is a block diagram illustrating a search system using images one embodiment of the present invention.

Reference will now be made in detail to the preferred embodiment of the present invention, examples of which are illustrated in the drawings attached hereinafter, wherein like reference numerals refer to like elements throughout. The embodiments are described below so as to explain the present invention by referring to the figures.

Now, the present invention will be described in more detail hereinafter with reference to the accompanying drawings.

Figure 2:
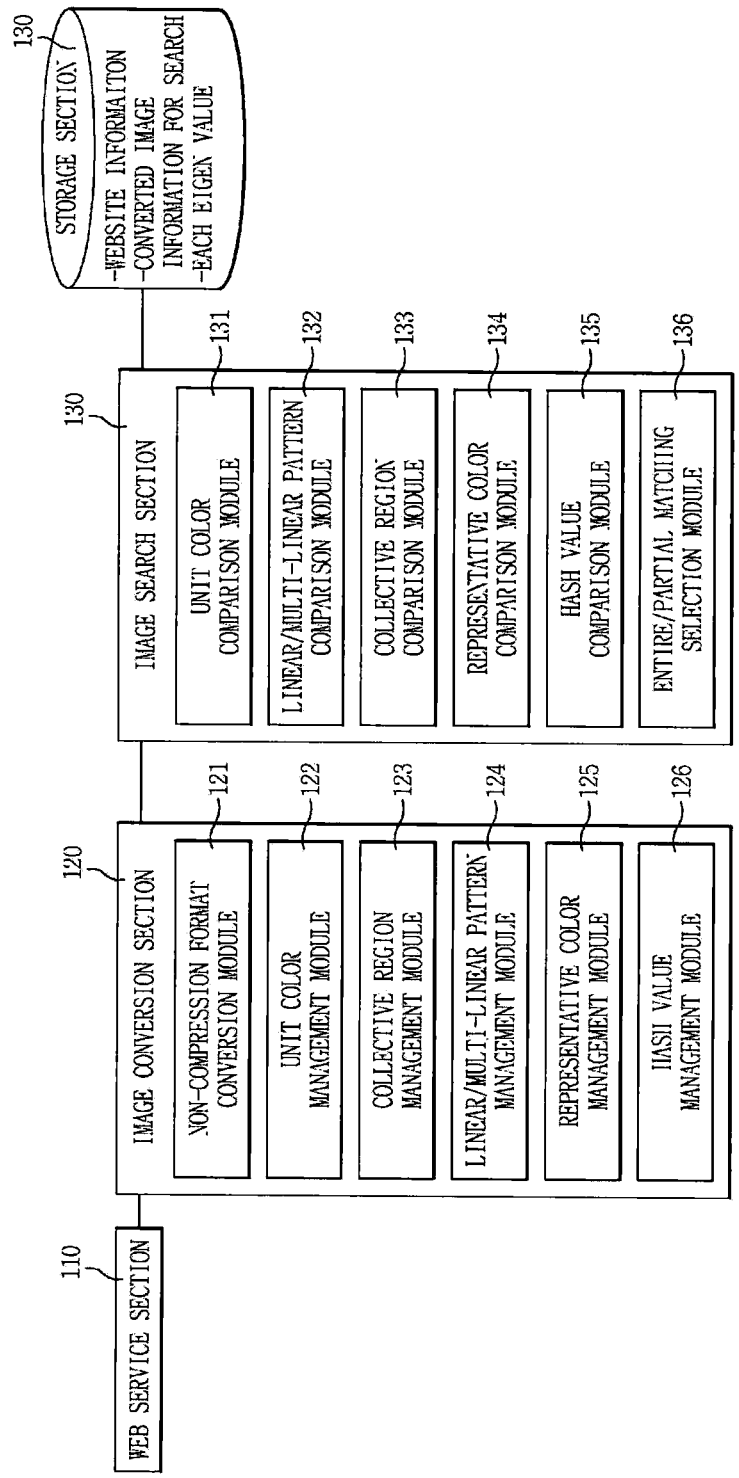
FIG. 2 is a detailed block diagram illustrating a image search server of FIG. 1.

FIG. 1 is a block diagram illustrating a search system using images one embodiment of the present invention, and FIG. 2 is a detailed block diagram illustrating an image search server of FIG. 1.

As shown in FIG. 1, an image search server 100 searches for website information from website servers 400 connected to a communication network, and then perform an image conversion on the searched website information and stores the image conversion result. Also, after the image search server 100 connects to the communication network 300, it receives an image to be searched (hereinafter, referred to as "to-be-searched image") from a user terminal 200 such as a mobile communication terminal 210, a user computer 220 or the like which can be connected to the Internet to perform an image conversion on the received image, and searches a registered image which matches the to-be-searched image so as to provide a variety of information. In this case, the to-be-searched image is an image which is directly registered from the user terminal or may include all kinds of images which can be displayed in a web browser.

The image search server 100 will be discussed hereinafter in more detail with reference to FIG. 2.

As shown in FIG. 100, the image search server 100 includes a web service section 110 for providing an Internet access service and then transmitting website information including a search image, in which a to-be-searched image of a user is registered, to a user terminal to allow the user terminal to output the transmitted website information; an image conversion section 120 for converting an image included in registered website information and a search image uploaded and registered by the user into search format images; an image search section 130 for comparing the search image uploaded by the user which has been converted in the image conversion section 120 with the search image included in the registered website information which has been converted in the image conversion section, detecting the website information from an image corresponding to the to-be-searched image uploaded by the user, and outputting the detected website information to the web service section 110 of the image search server 100; and a storage section 140 for storing the detected website information and information regarding the search format images converted in the image conversion section 120.

The web service section 110 can be implemented by a server system program for providing an Internet service such as IIS, Apache web server and the like. Also, an interface provided by the web service section 110 includes a search image registering interface screen for registering a search image using the user terminal connected thereto through the Internet. The search image registering interface screen allows for registration of the search image through an upload by a search image file name and a drag and drop of a corresponding search image on a monitor of a user terminal. In this case, the search image registering interface screen may be configured such that the user can input error information set arbitrarily.

Also, the image conversion section 120 includes a non-compression format conversion module 121, a unit color management module 122, a collective region management module 123, a linear/multi-linear pattern management module 124, a representative color management module 125 and a hash value management module 126.

The non-compression format conversion module 121 converts the image included in the website information and the to-be-searched image uploaded by the user into non-compression format images. In this case, the non-compressed file format converted by the non-compression format conversion module 121 means conversion of a compression file format of jpg files, etc., into a non-compression file format of bmp files, etc. The eigen value for an image refers to an annotated tag or link information for a corresponding website and is stored in the storage section 140.

Figure 4:
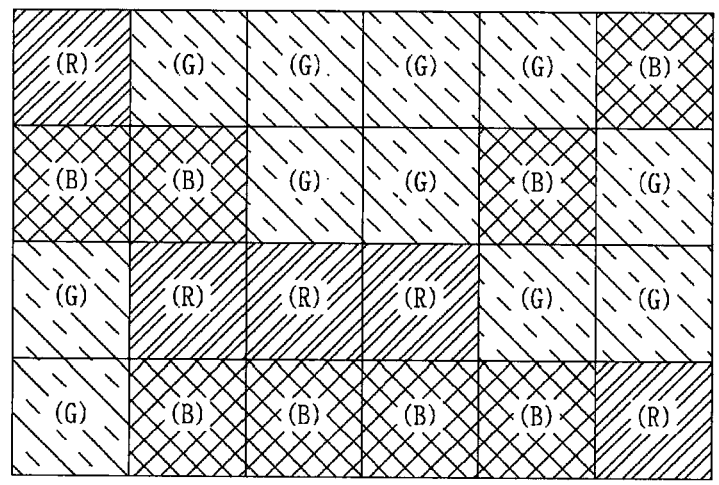
FIG. 4 is a view illustrating a concrete example of information on the number of colors.

The unit color management module 122 extracts the number of and the ratio between unit colors included in both the image included in the website information and the to-be-searched image uploaded by the user as eigen values. For example, as a unit color value representative of the unit color, red color can be designated as "1", green color can be designated as "2" and blue color can be designated as "3", arbitrarily respectively. A pixel-unit image as shown in FIG. 4 can be changed to a value representing each color as shown in FIG. 5. That is, in FIG. 4, assuming that each square is a pixel, an image consisting of 24(=6×4) pixels includes five red pixels, eight blue pixels and eleven green pixels. Each color number information is used as an eigen value for image search.

The collective region management module 123 extracts the number of colors and a degree of collection for the ratio between the colors at certain regions which are adjacent to or separate from each other in the image, as eigen values. For example, in the case where the colors of pixels at a specific region in the image are arranged in this order of red, red, blue and yellow and the colors of pixels at a region spaced apart by a given distance from the specific region are arranged in this order of green, green and blue, these information is used as the eigen value.

In the case where the values of a linear or multi-linear pattern (a face defined by a plurality of lines adjacent to each other or a plurality of lines not adjacent to each other) of pixels, or the colors in a similar and specific relation are adjacent to each other in a pixel unit, the linear/multi-linear pattern management module 124 extracts the linear/multi-linear pattern information between single/plural patterns in the pattern unit as the eigen value based on the value designated to the color of each pixel in the image included in the website information and the to-be-searched image uploaded by the user.

Figure 3:
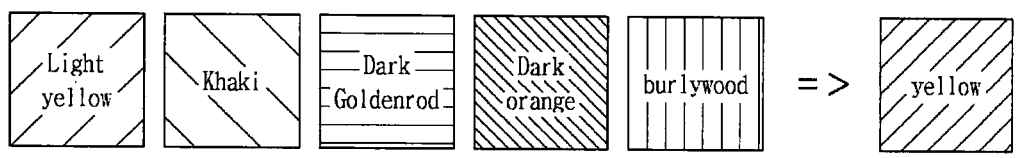
FIG. 3 is a view illustrating color simplicity.

The representative color management module 125 reduces the image included in the website information and the to-be-searched image uploaded by the user at an arbitrary fixed ratio, reconstruct each of the reduced images in a representative color among the colors of respective pixels based on an arbitrarily simplified color palette, and extracts the reconstructed representative color as the eigen value. In this case, the reduction of the images means the reduction of images file at a specific ratio, and the reconstruction of the images in the representative color means the conversion of the color of each pixel into an arbitrary representative color determined depending on a change in spectrum of HSV. For example, the reconstruction of the representative color is a change of the color palette according to saturation, brightness and the like. In this case, a variety of methods can be applied including a method in which a color is changed into a deeper or lighter color or an image is changed into while/black color, sepia-tone color, red color, yellow color, blue color or the like to simplify the color. That is, as shown in FIG. 3, five colors in the 36-color palette can be represented as one representative color which is yellow in the 16-color palette. The thus converted representative colors can be used such that each color is indicated by a specific number later.

The hash value management module 126 extracts a hash value for an initial file of the image as an eigen value. The hash value is generated by various kinds of formats besides CRC, MD5 and SHA-1. The hash value management module 126 generates a unique eigen value for each initial file, and the eigen value is typically represented in the form of "dkfj354k5k6lkdkf". In this case, even when a modification is made on only a part of any data file, this hash value becomes a completely different one. But when the modified part of the data file returns to its original state, the hash value again becomes an original hash value.

The storage section 140 annotates (tags or links) the website information searched by a search engine (not shown) or the like, the image converted into each non-compression file format by the non-compression format conversion module 121 and the unit color management module 122 of the image conversion section 120, a search format image such as a reduced file image and a color simplified image of the image converted into the non-compression format, the hash value information as the eigen value information, information on the number of and the ratio between unit colors, and the linear/multi-linear pattern information for the purpose of search of websites, and stores the annotated items of information along with the website information. That is, the storage section 140 annotates (tags or links) the eigen value corresponding to each file and stores the annotated eigen value along with the website information, so that a user can search a correctly matching image file at the speed of search level by means of an existing text.

In the meantime, the image search section 130 includes a unit color comparison module 131, a linear/multi-linear pattern comparison module 132, a collective region comparison module 133, a representative color comparison module 134, a hash value comparison module 135, and an entire/partial matching selection module 136. In this case, the respective comparison modules can increase search efficiency by alone or a combination of two or more thereof.

The unit color comparison module 131 compares the eigen values extracted by the unit color management module 122 for the number of and the ratio between the unit colors included in both the image included in the website information and the to-be-searched image uploaded by the user, and determines whether or not the compared eigen values match each other.

The linear/multi-linear pattern comparison module 132 compares the eigen values of the linear/multi-linear patterns extracted by the linear/multi-linear pattern management module 124 for the image included in the website information and the to-be-searched image uploaded by the user, and determines whether or not the compared eigen values match each other.

The collective region comparison module 133 compares the eigen values of the collective regions extracted by the collective region management module 123 for the image included in the website information and the to-be-searched image uploaded by the user, and determines whether or not the compared eigen values match each other.

The representative color comparison module 134 compares the eigen values of the representative colors extracted by the representative color management module 125 for the image included in the website information and the to-be-searched image uploaded by the user, and determines whether or not the compared eigen values match each other.

The hash value comparison module 135 compares the eigen values of the hash values extracted by the hash value management module 126 for the image included in the website information and the to-be-searched image uploaded by the user, and determines whether or not the compared eigen values match each other.

The entire/partial matching selection module 136 is provided to adjust an error range for the comparison results of the respective eigen values compared by the comparison modules 131 to 135 of the image search section 130. The user can arbitrarily set an "accuracy setting" item through the entire/partial matching selection module 136 during the search.

In the case where the image search section 130 searches for the website information including the search image uploaded, it annotates information regarding a corresponding website to the website information stored in the storage section to store the annotated information in the storage section, and outputs the annotated information to the user terminal, so that the user can perform a keyword search for a corresponding information later.

Figure 7:
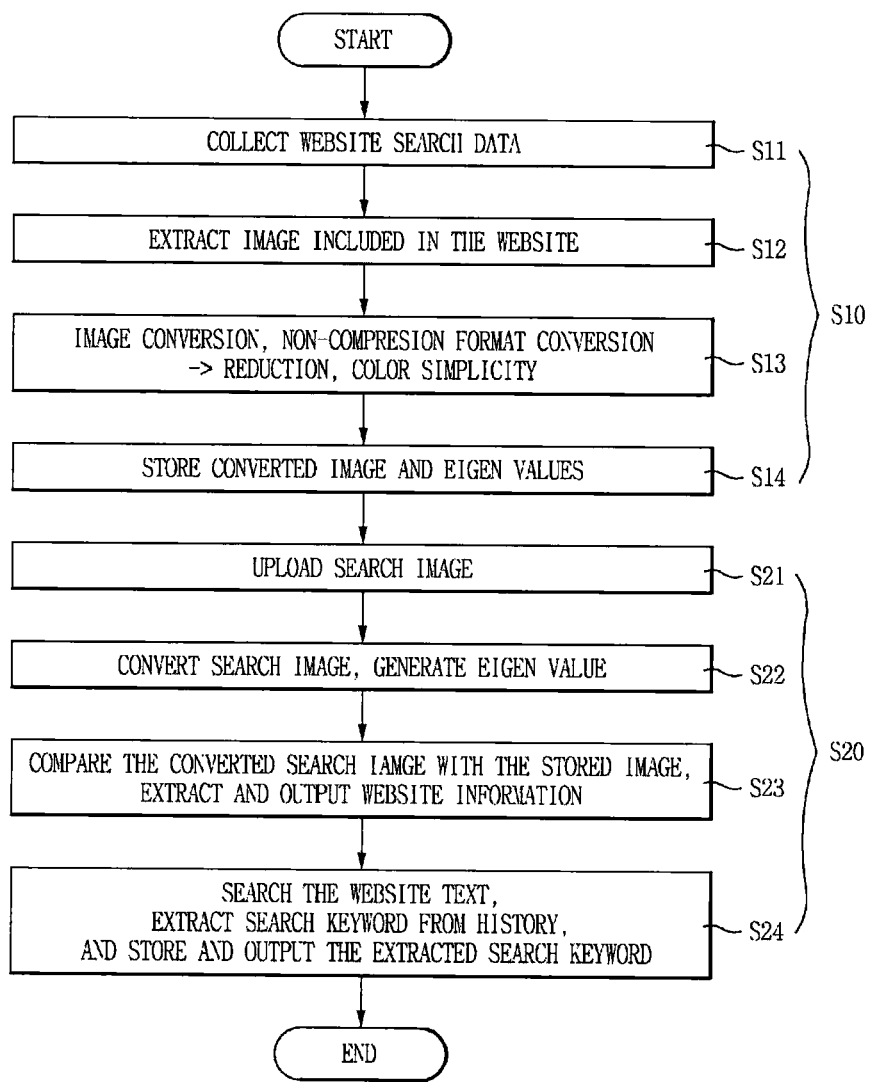
FIG. 7 is a flow chart illustrating a search processing method performed by the search system using images according to the present invention.

FIG. 7 is a flow chart illustrating a search processing method performed by the search system using images according to the present invention.

As shown in FIG. 7, the search processing method performed by the search system using images according to the present invention including the web service section, the image conversion section and the image search section includes an image conversion process (S10) in which the image conversion section 120 converts an image included in the website information, which is searched on the Internet and is stored into a search format image to store the converted search format image, and converts a to-be-searched image uploaded by the user into a search format image, and a website search process (S20) in which the image search section 130 compares the image of the website information and the to-be-searched image uploaded by the user, which are converted into the search format image, and searches for the website information including the to-be-searched image uploaded by the user.

In the image conversion process (S10) of the above-mentioned search processing method, a website information search step (S11) is performed in which website information provided on the Internet is searched for and the searched information is stored as shown in FIG. 7.

Also, the image included in the website information searched in the website information search step (S11) is extracted (S12) and the extracted image is subjected to image conversion (S13).

In this case, the image conversion performed in the step S13 includes the steps of: converting the image included in the searched website information into a search format image; extracting a hash value from the converted search format image as an eigen value; extracting the number of unit colors and the ratio between the unit colors as eigen values; extracting the number of unit colors and the ratio between the unit colors at a certain collective region as eigen values; extracting the linear/multi-linear pattern information as an eigen value; and reconstructing a reduced image in a representative color among the colors of respective pixels and extracting the reconstructed representative color as an eigen value.

In this case, the non-compression format image conversion refers to conversion of the image included in the website information, which has previously searched and stored, and the to-be-searched image uploaded by the user into a non-compression format image by the non-compression format conversion module 121 of the image conversion section 120.

Also, the extraction of the hash value from the converted search format image as the eigen value refers to extraction of a hash value for an initial image file from the image included in the website information and the to-be-searched image uploaded by the user as an eigen value.

In addition, the extraction of the number of unit colors and the ratio between the unit colors as the eigen values refers to the extraction of the number of and the ratio between the unit colors included in both the image included in the website information and the to-be-searched image uploaded by the user as eigen values by the unit color management module 122.

Further, the extraction of the number of unit colors and the ratio between the unit colors at a certain collective region as eigen values refers to extraction of a degree of collection for the number of colors and the ratio between the colors at certain regions which are adjacent to or separate from each other in the image included in the website information and the to-be-searched image uploaded by the user as an eigen value by the collective region management module 123.

Besides, the extraction of the linear/multi-linear pattern information as the eigen value refers to that in the case where the values of a linear or multi-linear pattern, or the colors in a similar and specific relation are adjacent to each other in a pixel unit, the linear/multi-linear pattern management module 124 extracts the linear/multi-linear pattern information between single/plural patterns in the pattern unit as the eigen value based on the value designated to the color of each pixel in the image included in the website information and the to-be-searched image uploaded by the user.

Furthermore, the reconstruction of the reduced image in the representative color among the colors of the respective pixels and extracting the reconstructed representative color as the eigen value refers to that the representative color management module 125 reduces the image at an arbitrary fixed ratio, reconstruct the reduced image in a representative color among the colors of the respective pixels based on an arbitrarily simplified color palette, and extracts the reconstructed representative color as the eigen value.

Since the extraction steps of the eigen values has been described above in detail with reference to FIGS. 1 to 6, its detailed description will be omitted.

Next, after the above-mentioned image conversion has been performed, the converted image and the eigen values are annotated to the corresponding website information stored in the storage section and are stored in the storage section.

The above-mentioned steps S11 to S14 is referred to as the image conversion process (S10).

Subsequently, after the image conversion process (S10) has been performed, the website search process (S20) of searching for website information using the to-be-searched image uploaded by the user will be described hereinafter.

In the step S21 of the website search process (S20), as shown in FIG. 7, after a user who desires to retrieve information gains access to the image search server 100 using the user terminal 200, he or she registers, a search image corresponding to website information to be searched, on an interface screen provided by the web service section 110 of the image search server 100 in a file-upload or drag-and-drop manner and uploads the registered search image to the image search server 100. In this case, the user can enter error information of different angles, colors, sizes and eigen values for the search image so as to select a search by entire matching or partial matching. That is, the user can determine an error range to perform an error-setting step for an efficient search so as to consider an arbitrary error. Such error range adjustment can be provided on an interface provided by the web service section, which is called "accuracy setting" such that the user can arbitrarily set the error range.

Thereafter, the image conversion section 120 of the image search server 100 performs image conversion on the search image uploaded thereto by the user. In this case, as described above with reference to FIGS. 1 to 6, the image conversion performed in the step S22 includes the steps of: converting the image included in the searched website information into a search format image; extracting a hash value from the converted search format image as an eigen value; extracting the number of unit colors and the ratio between the unit colors as eigen values; extracting the number of unit colors and the ratio between the unit colors at a certain collective region as eigen values; extracting the linear/multi-linear pattern information as an eigen value; and reconstructing a reduced image in a representative color among the colors of respective pixels and extracting the reconstructed representative color as an eigen value.

Next, as described above, after the image conversion for the to-be-searched image uploaded by the user has been performed and the eigen values have been extracted, in the step S23, the eigen values for the to-be-searched image uploaded by the user and the eigen values for the image included in the website information stored in the storage section 140 are compared with each other, and then corresponding website information is searched for and outputted based on the comparison result.

In this case, in step S24, the comparison between the eigen values for the to-be-searched image uploaded by the user and the image included in the website information for search of the website information includes the steps of: comparing the hash values for the converted search format image; comparing the eigen values for the number of unit colors and the ratio between the unit colors; comparing the eigen values for the number of unit colors and the ratio between the unit colors at a certain collective region; comparing the eigen values for the linear/multi-linear pattern information; and comparing the eigen values for the reconstructed representative color of respective pixels.

The comparison between the eigen values for the to-be-searched image uploaded by the user and the image included in the website information includes an entire matching step or a partial matching step.

The website information search processing method will be described in more detail hereinafter with reference to FIGS. 8 to 12.

First, the entire matching or the partial matching between the eigen values for the to-be-searched image uploaded by the user and the image included in the website information refers to a step of comparing one or more of the eigen values of the non-compression format image, or the reduced file image and the color simplified image and determining whether or not there is the entire matching between the compared eigen values or there is the partial matching between the compared eigen values within a certain error range.

Figure 10:
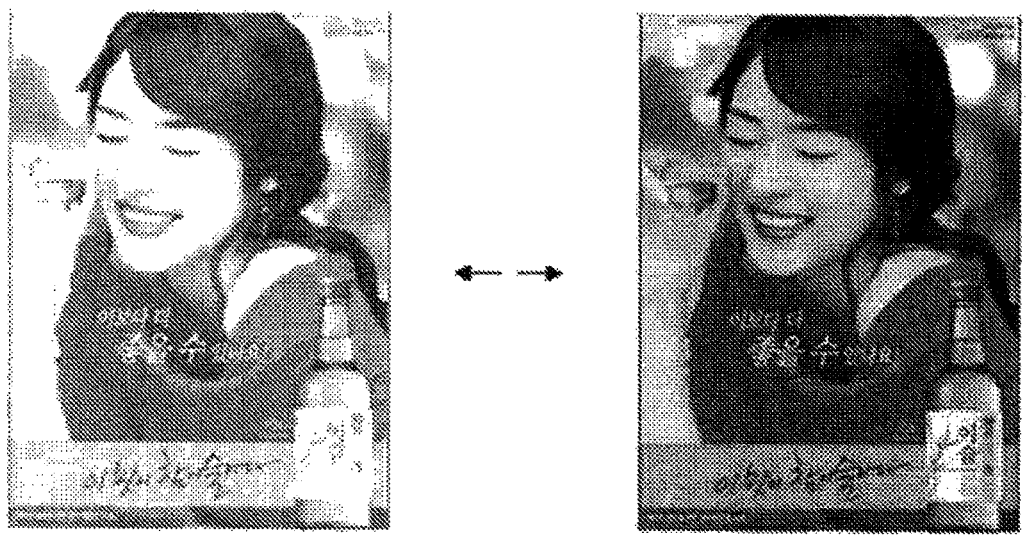
FIG. 10 is a photographic view illustrating two images for use in the partial matching determination for the eigen values, which images are the same as in terms of size but are different from each other in terms of color information.

In other words, in the entire matching determining step of the process of comparing the hash values, comparing the eigen values for the number of unit colors and the ratio between the unit colors and comparing the eigen values for the number of unit colors and the ratio between the unit colors at a certain collective region, as shown in FIG. 9, the left image of two images is the to-be-searched image uploaded by the user, and the right image is the image included in the website information, which are the same as each other in terms of size and color. In this case, the image search of the present invention enables retrieval of the website information including the to-be-searched image uploaded by the user through the step of determining the entire matching between the eigen values. In addition, in the partial matching determining step, as shown in FIG. 10, the to-be-searched image uploaded by the user and the image included in the website information are the same as in terms of size but are different from each other in terms of color due to discoloring, etc. In this case, the website information including the image having the eigen values within a certain error range (accuracy range) for the matching between the eigen values is detected as the website information to be searched.

Figure 11:
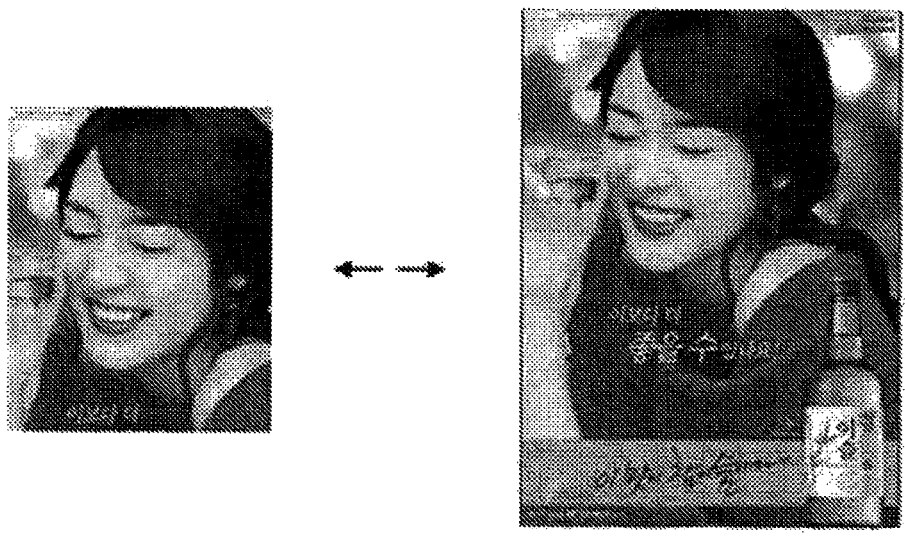
FIG. 11 is a photographic view illustrating two images for use in the entire matching determination for the linear/multi-linear pattern information when the search image is a part of the to-be-searched image.

Next, in the step of determining the entire matching between the linear/multi-linear pattern information, as shown in FIG. 11, when the to-be-searched image at the left side is a part of the searched image at the right side, a linear pattern for the to-be-searched image is set and the eigen value for the linear pattern is generated. Then, the same linear pattern is extracted from the searched image and the eigen value is generated. Thereafter, the respective generated eigen values for the to-be-searched image and the searched image are compared with each other. If the eigen values match each other, the website information including a corresponding to-be-searched image is detected as the website information to be searched. In the step of determining the partial matching between the linear/multi-linear pattern information, as shown in FIG. 12, the to-be-searched image at the left side is a part of the searched image at the right side, and the to-be-searched image and the searched image are different from each other in terms of color due to discoloring, etc. In this case, a linear pattern for the corresponding to-be-searched image is set and the eigen value for the linear pattern is generated. Then, the same linear pattern is extracted from the searched image and the eigen value is generated. Thereafter, the respective generated eigen values for the to-be-searched image and the search image are compared with each other. If the eigen values match each other within a certain error range, the website information including a corresponding to-be-searched image is detected as the website information to be searched.

Then, after the search of the website information as described above has been completed, a keyword for retrieval of corresponding website information is detected from search history information for the searched website and then is annotated to the website information stored in the storage section so as to perform a step of detecting the keyword, which is in turn stored in the storage section. The searched keyword is outputted to the user terminal so that the user can perform a keyword search for the corresponding website information (S24).

As described above, the search system using images according to the present invention provides advantageous effects in that even when a user who performs information search on the Internet does not correctly know a relevant URL or search keyword, he or she can search for information on the Internet using an associated image to be searched.

In addition, the present invention provides further advantageous effects in that an image owner can easily search whether or not his or her image is used without any consent and permission of the image owner so as to protect an image copyright.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A computer-implemented method for searching using an image, comprising:
receiving an image;
determining, by a processor, at least one first characteristic value for the image using a ratio between pixel colors of the image;
determining, by the processor, at least one second characteristic value for the image, the second characteristic value representing a sequence of pixel colors of a portion of the image, wherein the portion of the image comprises a sequence of pixels, each pixel in the sequence of pixels having a pixel color in the sequence of pixel colors;

comparing the first characteristic value and the second characteristic value with characteristic values for a second image to determine whether the second image is a matching image for the image; and sending information related to the second image.

2. The method of claim 1, further comprising:

sending a user interface to a user device, the user interface comprising a drag-and-drop for uploading an image for searching.

3. The method of claim 1, further comprising:

determining at least one first characteristic value for the second image using a ratio between pixel colors of the second image; and determining at least one second characteristic value for the second image, the second characteristic value representing a sequence of pixel colors of a portion of the second image, wherein the portion of the second image comprises a sequence of pixels, each pixel in the sequence of pixels having a pixel color in the sequence of pixel colors;

wherein comparing comprises comparing the first characteristic value for the image with the first characteristic value for the second image, and comparing the second characteristic value for the image with the second characteristic value for the second image to determine whether the second image is a matching image for the image.

4. The method of claim 1, further comprising:

reducing the image at a fixed ratio; and reconstructing the image in a representative color based on a simplified color palette; and determining at least one third characteristic value for the reconstructed image in the representative color.

5. The method of claim 1, further comprising:

determining at least one fourth characteristic value for the image using a linear/multi-linear pattern between single/plural patterns.

6. The method of claim 1, further comprising:

adjusting an error range for the determining whether the second image is a matching image for the image.

7. The method of claim 1, further comprising:

determining at least one fifth characteristic value for the image using hash values of the image.

8. A computer program for searching using an image, the computer program embodied in a non-transitory computer-readable medium storing instructions for a processor, when executed, to perform a method, the method comprising:

receiving an image;

determining at least one first characteristic value for the image using a ratio between pixel colors of the image;

determining, by the processor, at least one second characteristic value for the image, the second characteristic value representing a sequence of pixel colors of a portion of the image, wherein the portion of the image comprises a sequence of pixels, each pixel in the sequence of pixels having a pixel color in the sequence of pixel colors;

comparing the first characteristic value and the second characteristic value with characteristic values for a second image to determine whether the second image is a matching image for the image; and sending information related to the second image.

9. The computer program of claim 8, wherein the method further comprises:

sending a user interface to a user device, the user interface comprising a drag-and-drop for uploading an image for searching.

10. The computer program of claim 8, wherein the method further comprises:

determining at least one first characteristic value for the second image using a ratio between pixel colors of the second image; and determining at least one second characteristic value for the second image, the second characteristic value representing a sequence of pixel colors of a portion of the second image, wherein the portion of the second image comprises a sequence of pixels, each pixel in the sequence of pixels, having a pixel color in the sequence of pixel colors;

wherein comparing comprises comparing the first characteristic value for the image with the first characteristic value for the second image, and comparing the second characteristic value for the image with the second characteristic value for the second image to determine whether the second image is a matching image for the image.

11. The computer program of claim 8, wherein the method further comprises:

reducing the image at a fixed ratio; and reconstructing the image in a representative color based on a simplified color palette; and determining at least one third characteristic value for the reconstructed image in the representative color.

12. The computer program of claim 8, wherein the method further comprises:

determining at least one fourth characteristic value for the image using a linear/multi-linear pattern between single/plural patterns.

13. The computer program of claim 8, wherein the method further comprises:

adjusting an error range for the determining whether the second image is a matching image for the image.

14. The computer program of claim 8, wherein the method further comprises:

determining at least one fifth characteristic value for the image using hash values of the image.

15. A system for searching using an image, comprising:

a memory; and a processor to execute instructions for:

receiving an image;

determining, by a processor, at least one first characteristic value for the image using a ratio between pixel colors of the image;

determining, by the processor, at least one second characteristic value for the image, the second characteristic value representing a sequence of pixel colors of a portion of the image, wherein the portion of the image comprises a sequence of pixels, each pixel in the sequence of pixels having a pixel color in the sequence of pixel colors;

comparing the first characteristic value and the second characteristic value with characteristic values for a second image to determine whether the second image is a matching image for the image; and sending information related to the second image.

16. The system of claim 15, wherein the instructions further comprise:

sending a user interface to a user device, the user interface comprising a drag-and-drop for uploading an image for searching.

17. The system of claim 15, wherein the instructions further comprise:

determining at least one first characteristic value for the second image using a ratio between pixel colors of the second image; and determining at least one second characteristic value for the second image, the second characteristic value representing a sequence of pixel colors of a portion of the second image, wherein the portion of the second image comprises a sequence of pixels, each pixel in the sequence of pixels having a pixel color in the sequence of pixel colors;

wherein comparing comprises comparing the first characteristic value for the image with the first characteristic value for the second image, and comparing the second characteristic value for the image with the second characteristic value for the second image to determine whether the second image is a matching image for the image.

18. The system of claim 15, wherein the instructions further comprise:

reducing the image at a fixed ratio; and reconstructing the image in a representative color based on a simplified color palette; and determining at least one third characteristic value for the reconstructed image in the representative color.

19. The system of claim 15, wherein the instructions further comprise:

determining at least one fourth characteristic value for the image using a linear/multi-linear pattern between single/plural patterns.

20. The system of claim 15, wherein the instructions further comprise:

adjusting an error range for the determining whether the second image is a matching image for the image.

21. The system of claim 15, wherein the instructions further comprise:

determining at least one fifth characteristic value for the image using hash values of the image.

22. The method of claim 1, wherein the characteristic value for a second image is stored as an annotated tag or link.

23. The computer program of claim 8, wherein the characteristic value for a second image is stored as an annotated tag or link.

24. The system of claim 15, wherein the characteristic value for a second image is stored as an annotated tag or link.

* * * * *